United States Patent [19]

Takeuchi

[11] Patent Number: 4,557,702
[45] Date of Patent: Dec. 10, 1985

[54] DAMPER DISC ASSEMBLY FOR CLUTCH

[75] Inventor: Hiroshi Takeuchi, Osaka, Japan

[73] Assignee: Kabushiki Kaisha Daikin Seisakusho, Osaka, Japan

[21] Appl. No.: 577,825

[22] Filed: Feb. 7, 1984

[30] Foreign Application Priority Data

Feb. 9, 1983 [JP] Japan ............................ 58-18451[U]

[51] Int. Cl.⁴ .............................................. F16D 3/14
[52] U.S. Cl. .................. 464/68; 192/106.2; 464/66
[58] Field of Search .......................... 192/106.1, 106.2; 464/64, 66, 68, 81

[56] References Cited

U.S. PATENT DOCUMENTS

| | | | |
|---|---|---|---|
| 2,764,004 | 9/1956 | Myers | 464/68 |
| 4,254,855 | 3/1981 | Hildebrand et al. | 192/106.2 |
| 4,351,168 | 9/1982 | Prince et al. | 192/106.2 X |
| 4,381,052 | 4/1983 | Maucher | 192/106.2 |
| 4,406,357 | 9/1983 | Nagano et al. | 464/68 X |
| 4,453,838 | 6/1984 | Loizeau | 192/106.2 X |
| 4,485,907 | 12/1984 | Nishimura | 464/68 X |

FOREIGN PATENT DOCUMENTS 2093564 9/1982 United Kingdom ................. 464/68

Primary Examiner—Donald Watkins
Assistant Examiner—Daniel P. Stodola
Attorney, Agent, or Firm—Burns, Doane, Swecker & Mathis

[57] ABSTRACT

A damper disc assembly has a hub adapted to be connected to an output shaft, an annular sub-plate rotatably fitted to the outer periphery of the hub, a pair of annular flanges disposed at both sides of the sub-plate and unrotatably connected to the hub, a pair of side plates having a torque input portion and disposed at both sides of the flanges, and a spring device for transmitting the torque disposed in the openings in the flanges, the subplate and the side plate, and designed to change damping characteristics during a torsion operation of the disc.

5 Claims, 6 Drawing Figures

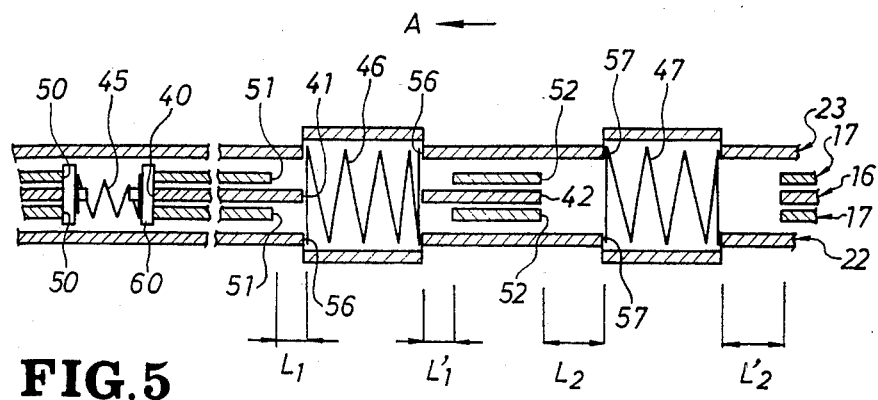
FIG.4
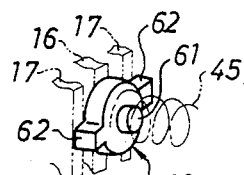
FIG.5
FIG.6
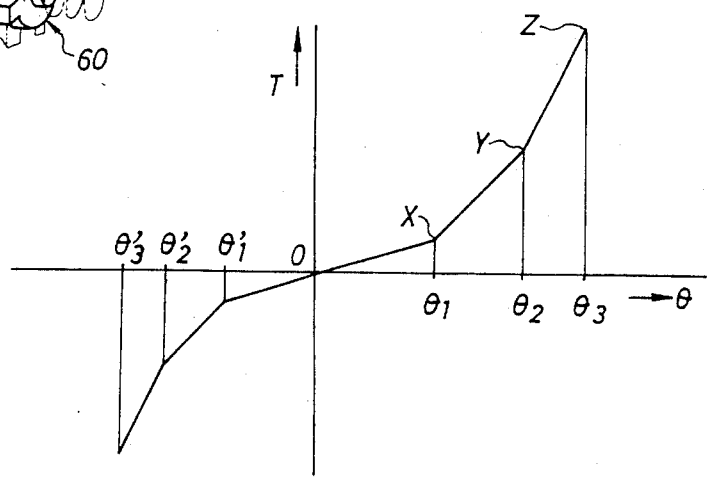

DAMPER DISC ASSEMBLY FOR CLUTCH

BACKGROUND AND SUMMARY OF THE INVENTION

The present invention relates to a damper disc assembly suitable for a friction clutch disc for an automobile, and more particularily to a disc assembly in which a sub-plate is employed to attain stepped damping characteristics.

In the U.S. patent application Ser. No. 347,157, the applicant of the invention has already disclosed a disc as illustrated in FIG. 1. In FIG. 1, a spline hub 1 is provided with a radial flange 2 divided into a radially inner portion 3 and an outer portion 4. According to this structure, the outer portion 4 is designed to turn with respect to the inner portion 3 so as to increase damping effect or absorbing effect for torque vibration.

However, this disc has following disadvantages. Since the inner and outer portions 3 and 4 are required to have integral projections 5 and 6 as well as recesses 7 and 8 for engaging with each other, it is difficult to form and machine the flange 2. Especially, the inner portion 3 is formed integrally with the hub 1 and requires small protrusions 9 on the inner surfaces of the recesses for holding springs, which make the manufacturing extremely difficult. Further, a damping characteristic in first step (in small torsion angle area) may become unstable, and it may be difficult to obtain sufficient strength.

Accordingly, it is an object of the invention to provide an improved damper disc assembly, overcoming the above noted disadvantages.

The essence of the invention is to provide a damper disc assembly in which a pair of annular flanges are disposed at both sides of a sub-plate unrotatably connected to a hub.

Other and further objects, features and advantages of the invention will appear more fully from the following description of the preferred embodiments of the invention.

BRIEF DESCRIPTION OF THE DRAWINGS

FIG. 4 is a sectional view taken along line IV—IV in FIG. 3;

FIG. 5 is a perspective view of a spring seat; and

FIG. 6 is a graph showing torsion characteristics of the disc assembly of the invention.

DETAILED DESCRIPTION OF THE PREFERRED EMBODIMENTS

Figure 2:
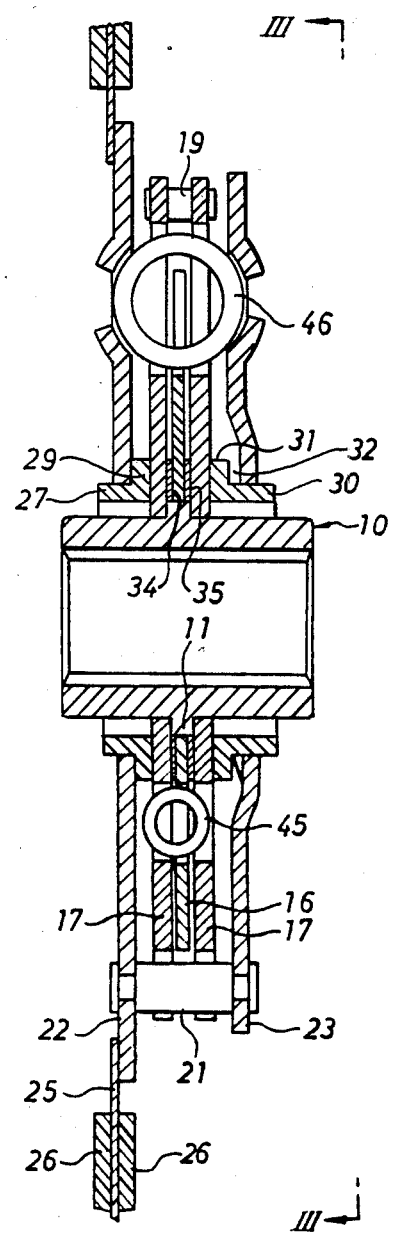
FIG. 2 is a sectional view of a clutch disc according to the invention taken along the line II—II of FIG. 3.
Figure 3:
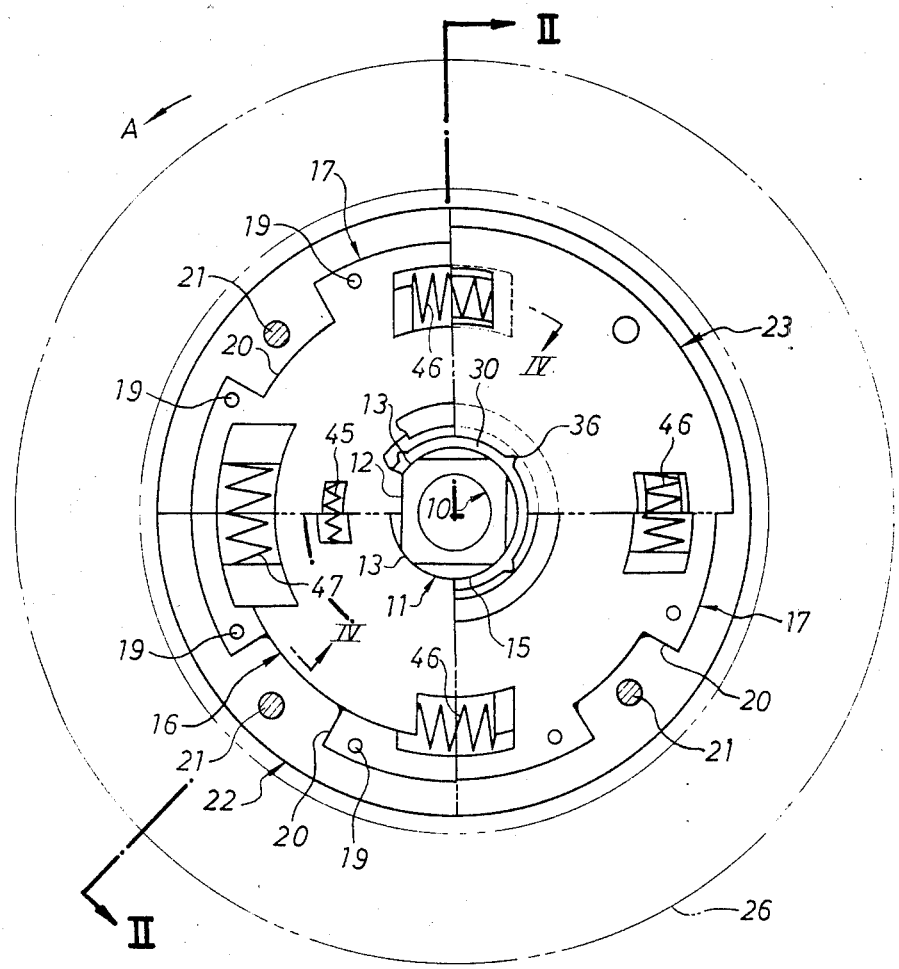
FIG. 3 is a schematic elevation view taken along line III—III of FIG. 2 with certain parts cut away.

Referring to FIG. 2, a spline hub 10 adapted to be spline fitted to an output shaft (not shown) is provided at its outer periphery with an flange-like projection 11 having a small diameter. As shown in FIG. 3, an outer peripheral surface 12 of the hub 10 has a substantially rectangular shape having round corners 13. A peripheral surface 15 of the projection 11 has circular and cylindrical shape.

Referring to FIG. 2, an annular sub-plate 16 is fitted around the peripheral surface 15 of the projection 11. As shown in FIG. 3, the inner periphery of the sub-plate 16 is circular and is closely and rotatably fitted to the peripheral surface 15 of the projection 11. Referring to FIG. 2, a pair of annular hub flanges 17 are disposed at both sides of the projection 11 and the sub-plate 16. The flanges 17 are fitted to the outer periphery of the hub 10. The flanges 17 may be made of cemented sheet steel formed by a press machine. The outer peripheral portions of the flanges 17 are spaced and fixed to each other by circumferentially spaced rivets 19. As shown in FIG. 3, the inner peripheries of the flanges 17 are substantially rectangular, and are closely and unrotatably fitted to the peripheral surface 12 of the hub 10. The rivets 19 are, for example, eight in number. Each flange 17 is provided at its outer periphery with four recesses 20, which respectively are positioned between the rivets 19 and extend radially inwardly to the near of the sub-plate 16. Stop pins 21 extending through the recesses 20 are fixed at each end to annular side plates 22 and 23.

Referring to FIG. 2, cushioning plates 25 are fixed to the outer peripheral portions of the side plate 22. A pair of friction facings 26 are fixed to respective surfaces of the plates 25. The inner periphery of the side plate 22 is rotatably fitted to the outer periphery of the hub 10 with a cylindrical bushing 27 therebetween. The bushing 27 is made from synthetic resin, and has a radial flange 29 having a small diameter and entering between the inner peripheral portions of the side plate 22 and the flange 17. The inner periphery of other side plate 23 is also rotatably fitted to the outer periphery of the hub 10 with a cylindrical bushing 30 therebetween. The bushing 30 has a radial flange 31 having a small diameter and entering between the inner peripheral portions of the side plate 23 and the flange 17. A cone spring 32 is disposed between the side plate 23 and the flange 31.

As shown in FIG. 2, a washer 34 having a small coefficient of friction is disposed between the radially inner portions of the sub-plate 16 and the flange 17 adjacent to the bushing 27. An annular cone spring 35 is disposed between the sub-plate 16 and the flange 17 adjacent to the bushing 30.

As shown in FIG. 3, the inner periphery of the bushing 30 is rotatably fitted to the corners 13 of the hub 10. The bushing 30 is provided at its outer periphery with, e.g., four projections 36. The side plate 23 is provided at its inner periphery with recesses into which the projections 36 are fitted. The side plate 23 is fitted through its full circumference to the bushing 30, so that the bushing 30 turns together with the side plate 23 with sliding on the corners 13 when the side plate 23 turns with respect to the hub 10. Fitting structure similar as the above is employed in the side plate 22, the bush 27 and the hub 10.

Referring to FIG. 4, the sub-plate 16 is provided with three kinds of openings 40, 41 and 42, in which compressible coil springs 45, 46 and 47 are disposed respectively. The flanges 17 are provided with openings 50, 51 and 52 in which the springs 45, 46 and 47 enter. Both side plates 22 and 23 are provided with openings 56 and 57 in which the springs 46 and 47 enter. The characteristics of the springs 45, 46 and 47 as well as sizes of the openings are determined as follows.

The axes of the springs 45, 46 and 47 extend parallel to the tangents of the disc. The spring 45 is one in number, and has a small spring constant. The springs 46 are three in number, and each has a medium spring constant. The spring 47 is one in number, and has a large spring constant. Both ends of the spring 45 are seated on the spring seats 60 made from synthetic resin. Referring to FIG. 5, each spring seat 60 has a circular plate-like body and is provided at the center with a projection 61. Each spring seat 60 is provided at its periphery with two diametrically opposing protrusions 62. Each projection 61 enters into the end of the spring 45 to prevent the spring 45 from drop out and disengagement. The protrusions 62 engage with side edges of the openings in the flanges 17. In a neutral position illustrated in FIG. 4, both ends of the spring 45 engage with the side edges of the openings 40 and 50 with the spring seat 60 therebetween, respectively. Respective ends of the springs 46 engage with the side edges of the openings 41 and 56, and are apart from the side edges of the openings 51 with short distances L1 and L'1 therebetween. The springs 46 are assembled in the openings 41 and 56 with precompressed condition. Both ends of the spring 47 engage with only the side edges of the opening 57 and are apart from the side edges of the openings 42 and 52 with long distances L1 and L'2 therebetween.

As shown in FIG. 3, each of the above openings has substantially an arc shape extending along a circumference of the disc. The springs 46 and 47 as well as the openings for the springs 46 and 47 are positioned in the radially outer portions of the disc, and are circumferentially equally spaced to each other, respectively. The spring 45 and the openings for the spring 45 are positioned radially inside the spring 47 with respect to the radial direction of the disc.

One specific function or operation of the disc can be as follows. When the friction facing 26 is pressed by a pressure plate (not shown) to a flywheel (not shown) of a driving engine, a torque is introduced from the facing 26 through the cushioning plates 25 to the side plates 22 and 23, so that the disc rotates in a direction indicated by an arrow A in FIG. 4.

In this operation, when the torque is smaller than a value corresponding to the pre-compressed force of the springs 46, the springs 46 are not compressed and rigidly connect the side plates 22 and 23 to the sub-plate 16, so that the side plates 22 and 23 and the sub-plate 16 turn or twist together in the direction of the arrow A with respect to the flanges 17. Therefore, only the spring 45 is compressed, and the torque is transmitted from the side plates 22 and 23 through the springs 46, the sub-plate 16 and the spring 45 to the flanges 17 and then to the output shaft through the hub 10 in FIG. 2. Since only the spring 45 is compressed in this operation, a rate of increase of the transmitted torque T with respect to increase of torsion angle θ is slow as shown in a section O-X in FIG. 6.

When the torsion angle increases to a value of θ1, the side plate 22 and 23 in FIG. 4 finish the travel of the distance L1 with respect to the flanges 17 and the springs 46 and contact the side edges 51 of the flanges 17, so that the springs 46 start to be compressed. Therefore, the torque is transmitted from the side plates 22 and 23 through the springs 46 to the flange 17 and only the side plates 22 and 23 turn with respect to the flanges 17. Further, the compression of the springs 46 causes the increased rate of the torque transmission as shown in a section X-Y in FIG. 6.

When the torsion angle increases to a value of θ2, the side plates 22 and 23 in FIG. 4 finish the travel of the distance L2 with respect to the flanges 17 and the spring 47 contacts the side edges of the openings 52 in the flanges 17, so that the spring 47 starts to be compressed. Therefore, the torque is transmitted from the side plates 22 and 23 through the springs 46 and 47 to the flanges 17. The compression of the springs 46 and 47 makes the increased rate of the torque transmission even greater as shown in a section Y-Z in FIG. 6.

When the torsion angle increases to a maximum value of θ3, the stop pins 21 contact the side edges of the recesses 20 in FIG. 3, so that further torsion or turn is prevented.

When the torque decreases, the members and the portions operate reversely with respect to the above operation. In a negative area illustrated in left and lower area in FIG. 6, the damping characteristic changes also twice.

In the above torsion operation, sliding occurs on the surfaces of the flanges 29 and 31 as well as the washer 34 and the cone spring 35. The friction force by this sliding causes a hysteresis torque (not shown) in the characteristics in FIG. 6. Therefore, vibrations of the transmitted torque are sufficiently absorbed by the elastical deformation of the springs 45, 46 and 47 and as well as the hysteresis torque.

Figure 1:
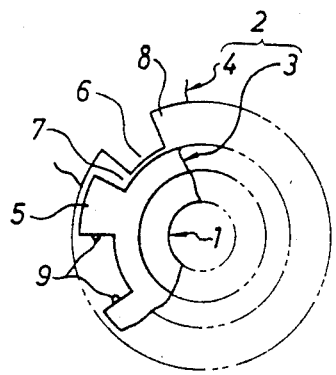
FIG. 1 is a sectional view of a damper disc according to a prior art.

According to the invention, as stated hereinbefore, since the flanges 17 are made entirely of the pressed sheet metal, it is not necessary to provide the disc with the flange portion 3 in FIG. 1 having complicated shape and structure and integral with the hub 1. Therefore, the hub 10 and the flanges 17 can be manufactured easily and simply. Since the sub-plate 16 is one in number, reduction of the parts, weight and sizes can be attained in the disc. Since the axially spaced two flanges 17 support the springs 45, 46 and 47, the strength of the flanges 17 against the load or force by the springs is increased, which makes the damping characteristics stable.

In a modification of the invention, the outer periphral shape of the hub 10 may be polygonal having three, five or more corners. The outer periphery of the hub 10 may be circular and provided with projections, spline teeth and/or hollows with which the flanges 17 unrotatably engage. The structures of the springs and the openings may be modified so that the damping characteristics of the springs change once and have two steps. Other structure may be employed in the friction means. For example, the changing point (θ1, θ2) of the torque increasing rate depending on the springs may be different from the changing point of the hysteresis torque.

The present invention may be employed also in a damper disc in which the radially outer portion of the side plate 22 are fixed to a flywheel.

Although the invention has been described in its preferred from with a certain degree of particularily, it is understood that the present disclosure of the preferred form may be changed in the details of construction and arrangement of parts may be resorted to without departing from the spirit and scope of the invention as hereinafter claimed.

What is claimed:
1. A damper disc assembly comprising:
a hub adapted to be connected to an output shaft, having a portion with a generally polygonal external shape and arcuate corners and including a flange-like projection having a circular outer peripheral surface;
an annular sub-plate rotatably fitted to the outer periphery of the flange-like projection;
a pair of annular hub flanges having inner peripheries generally corresponding in shape to the generally polygonal external shape of the hub, one disposed at each side of the sub-plate, the flanges being closely and unrotatably fitted to the generally polygonal external shape of the hub;

a pair of bushings rotatably mounted on the arcuate corners of the hub portion;

a pair of side plates having a torque input portion, disposed at both sides of the flanges and unrotatably fixed to a corresponding one of the pair of bushings; and a spring means for transmitting the torque, disposed in openings in the flanges, the sub-plate and the side plates, and designed to change damping characteristics during a torsion operation of the disc.

2. A damper disc assembly of claim 1 wherein said hub has a substantially rectangular outer peripheral surface, and the inner peripheries of the hub flanges are positioned at both sides of the projection.

3. A damper disc assembly of claim 1 wherein said spring means is provided with a weak spring which engages with side edges of the openings in the sub-plate and the flanges in a neutral position, and a precompressed strong spring which engages with side edges of the openings in the side plates and the sub-plate in the neutral position.

4. A damper disc assembly of claim 3 wherein said weak spring engages with the side edges through a spring seat having projections for preventing disengagement of the weak spring.

5. A damper disc assembly of claim 1 wherein the bushings have radial flanges entering between the side plate and the hub flanges.

* * * * *